(12) United States Patent
Chuang

(10) Patent No.: US 7,339,710 B2
(45) Date of Patent: Mar. 4, 2008

(54) HOLOGRAPHIC RECORDING MEDIUM, HOLOGRAPHIC READING SYSTEM, AND DATA READING METHOD FROM THE HOLOGRAPHIC RECORDING MEDIUM

(75) Inventor: Ernest Chuang, Tokyo (JP)

(73) Assignee: Sony Corporation, Tokyo (JP)

( * ) Notice: Subject to any disclaimer, the term of this patent is extended or adjusted under 35 U.S.C. 154(b) by 278 days.

(21) Appl. No.: 11/045,319

(22) Filed: Jan. 31, 2005

(65) Prior Publication Data

US 2005/0185231 A1 Aug. 25, 2005

(30) Foreign Application Priority Data

Feb. 4, 2004 (JP) .............................. 2004-028011

(51) Int. Cl.
*G03H 1/02* (2006.01)
(52) U.S. Cl. .................. 359/3; 359/18; 359/1; 369/103
(58) Field of Classification Search ..................... 359/3, 359/4, 7, 12, 18, 27
See application file for complete search history.

(56) References Cited

U.S. PATENT DOCUMENTS

| | | | | |
|---|---|---|---|---|
| 4,550,395 A | * | 10/1985 | Carlson | 369/103 |
| 5,285,438 A | * | 2/1994 | Marchand et al. | 369/103 |
| 6,414,762 B1 | * | 7/2002 | Yamaji et al. | 359/7 |
| 6,766,958 B1 | * | 7/2004 | Roh | 235/491 |
| 2003/0161246 A1 | * | 8/2003 | Chuang | 369/103 |
| 2005/0036182 A1 | * | 2/2005 | Curtis et al. | 359/15 |
| 2005/0270609 A1 | * | 12/2005 | Chuang et al. | 359/22 |

* cited by examiner

*Primary Examiner*—Fayez G. Assaf
(74) *Attorney, Agent, or Firm*—Oblon, Spivak, McClelland, Maier & Neustadt, P.C.

(57) ABSTRACT

A holographic disc recording medium records a hologram over the entire holographic disc recording medium by using a conical reference beam for recording. A hologram recorded image includes recorded images of a plurality of data pages including a plurality of pixels arranged in an approximately rectangular array. A cylindrical reference beam for reading having coherent light having an approximately cylindrical wavefront shape with a small curvature is used to minimize the mismatch in wavefront shapes between the reference beam for recording and reference beam for reading.

17 Claims, 7 Drawing Sheets

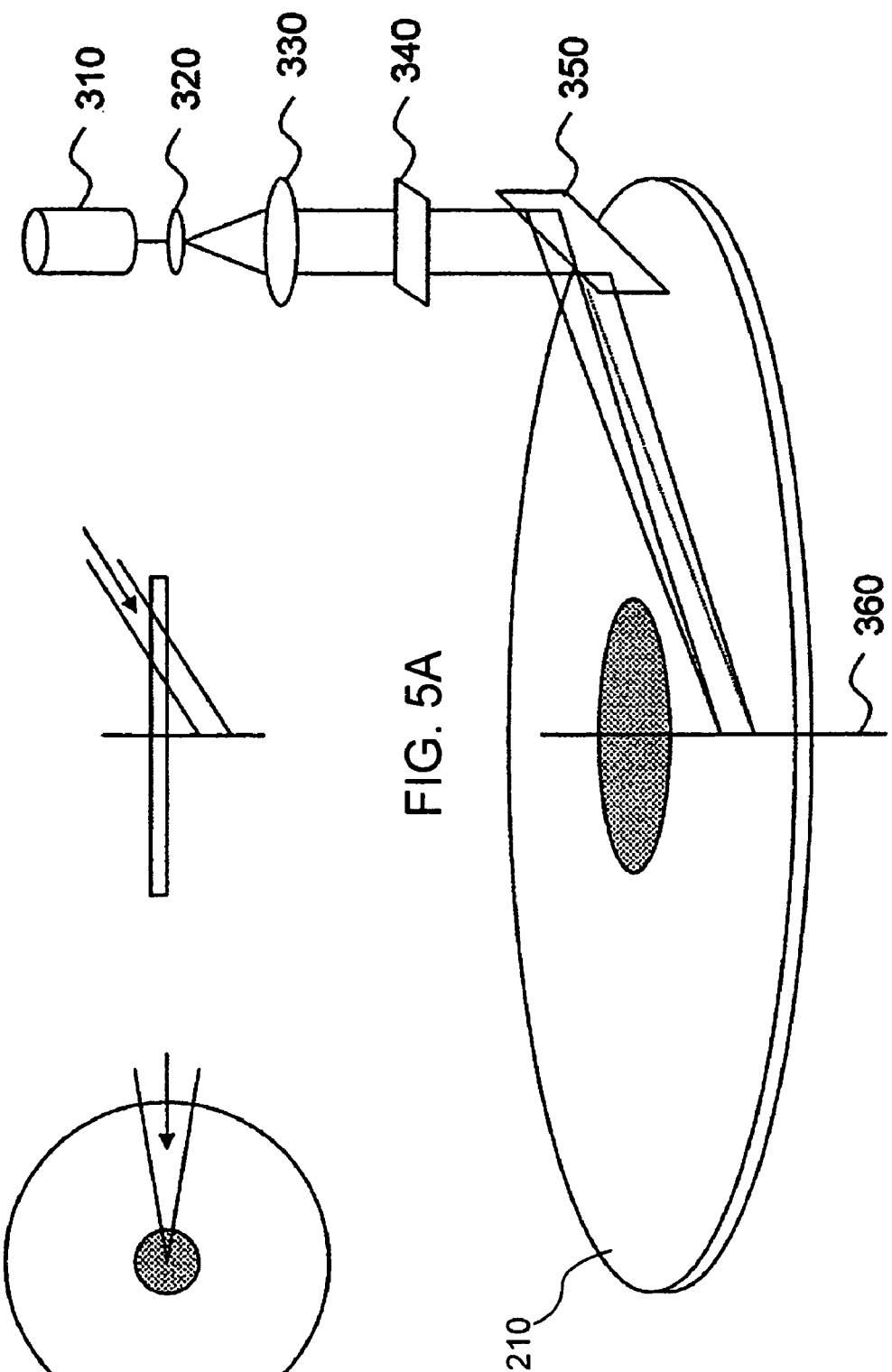

HOLOGRAPHIC RECORDING MEDIUM, HOLOGRAPHIC READING SYSTEM, AND DATA READING METHOD FROM THE HOLOGRAPHIC RECORDING MEDIUM

BACKGROUND OF THE INVENTION

1. Field of the Invention

The present invention relates to a holographic data recording medium, and more particularly, to a system and a method for recording and reading holographic data.

2. Description of the Related Art

Variously-proposed holographic data recording systems commonly include recording many pages of data at one or more locations within a holographic recording medium. A plurality of pages of data can be multiplied and be recorded at a single location by changing a characteristic of the reference beam used for recording, such as illuminating angle or wavelength of the reference beam for recording. A spatial light modulator (SLM) such as a liquid crystal display panel is typically used to imprint data to be recorded onto a signal beam. To read out the hologram recorded to the holographic recording medium, a reference beam for reading with the same characteristics as the one for recording is used to retrieve the specific hologram, and the data page shown as the reconstructed image of the hologram is read with a two-dimensional detector array, such as a CCD (charge-coupled device) or CMOS (complementary metal oxide semiconductor) array.

The schematically-described holographic data recording systems suffer from the following limitations. That is, the recording density of data in the page is limited by the pixel size and pitch that can be provided by the SLM and detector array and, to compensate for this, hundreds or thousands of holograms need to be multiplexed at each recording location in the holographic recording medium in order to achieve high recording density thereof. Depending on the method of multiplexing used and the amount of overlap between spatial locations in the recording medium, the shape of the volume occupied by each hologram will vary, as will the effective number of holograms multiplexed at each point in the recording medium. Both of these factors can result in nonuniform reading intensities among different holograms in the single recording medium, as well as among different pixels in a hologram, requiring complex compensation techniques to reduce error probabilities in reading the data. If spatial locations do not overlap in the recording medium, then dynamic range is lost in the unused material between discrete locations.

Furthermore, there is currently no feasible method for the fast replication of holographic memory recorded with such holographic data recording systems. For the above-mentioned replication of holographic memory, each hologram must be recorded sequentially for each multiplexed page and at every spatial location in the recording medium. Complicated exposure steps must be repeated at every recording location in order to obtain holograms of equal intensities.

Holographic recording and readout systems that avoid many of these problems and can be quickly replicated by using full-disc holograms for recording images on the disc without any change as the holograms were proposed by the present inventor. A more specific disc recording system was proposed by the present inventor, using a conical optical element to produce a reference beam for recording that illuminates the disc at a constant radial angle at all positions on the disc holographic recording medium. An alternate disc holographic recording system was then proposed by the present inventor, using a spherical reference beam for recording instead of the conical reference beam for recording (refer to Japanese Unexamined Patent Application Publication No. 2001-23169, Japanese Unexamined Patent Application Publication No. 2002-207412, and U.S. Patent Publication No. 2003-0161246).

Examples of typical conventional-art full-disc hologram recording and readout systems are illustrated in FIGS. 7 and 8, respectively. FIG. 7 illustrates a process for recording data mask patterns to a single-volume holographic disc recording medium 1. Referring to FIG. 7, copies of multiple data mask patterns are recorded to the holographic disc recording medium 1 by exchanging the data mask and repeating the recording process. Illuminating each mask with a normally incident planewave, in the recording process, the diffracted pattern is recorded in an adjacently placed transmission-type data mask 2 of the holographic disc recording medium 1, by vertically illuminating a plane beam 5 from the top in FIG. 7 and by illuminating a conical reference beam 3 for recording incident from the opposite side (bottom in FIG. 7) shaped by a conical mirror 4 of the holographic disc recording medium 1 to record holograms in the reflection geometry. A conical beam is shaped to approximate a planewave reference beam with a constant radial angle at all positions on the holographic disc recording medium 1 and input the reference beam. Upon reading the holograms, referring to FIG. 8, the hologram at the illuminating points of the entire ones can be partly read by locally illuminating a reference beam 6 for reading with small beam diameter serving a planewave at a fixed incident angle in the radial direction while the hologram disc recording medium 1 is rotated. The illumination of reference beam 6 for reading propagating in the inverse direction of the reference beam 3 for recording produces a real image of the pattern of the recorded data mask 2 around the point of readout (illuminating point). Likely the reading system of the conventional optical discs, a real image of the reconstructed image is formed on a detector 8 by using an optical system for forming an image including an objective lens 7. The data may be read once from a single track forming the pattern of the data mask 2, or may be read once from the two or more tracks in parallel therewith in a multi-track format for parallely reading the format of the data mask 2. Multiple data layers may be multiplexed by following two multiplexing methods. That is, according to an incident-angle multiplexing method, serving as one multiplexing method, the conical mirror 4 is exchanged every multiplexing and recording a plurality of data masks to change the incident angle of the reference beam for recording. According to a wavelength multiplexing method serving as the other multiplexing method, the wavelength of the reference beam for recording is changed by using a wavelength changing laser.

These proposed full-disc hologram systems have generally assumed that the data patterns recorded to the holographic recording medium are in the form of spiral tracks of pixels, thus serially reading-out the reference beam for reading under continuous illumination, similar to the manner for reading pits from a conventional optical disc such as CD (compact disc) or DVD (digital versatile disc). However, this reading system does not take advantage of one of the inherent benefits of holography, which is potential for increased transfer rate through parallel readout. Also, the continuous serial readout of pixels prevents the use of CCD or CMOS detectors, which integrate detected photons over a short period of time in order to achieve higher signal-to-noise ratio (SNR) as compared with that of photodiodes used for serial detection systems like for conventional optical discs. Holograms also tend to have intensity variations within the bright and dark areas of the hologram image, which increases jitter in the location of bright-to-dark- and dark-to-bright transitions in a serially read signal from a reconstructed image of the hologram. On the contrary, small reading-intensity variations are less of a problem with CCD and CMOS detectors, for which noise can be reduced by averaging over pixel areas and thresholds can be defined to distinguish bright and dark pixels. Although the use of parallel readout with CCD or CMOS detector is common in the field of holographic data recording technology, it has only been used for reading small holograms recorded locally over a disc surface (not with full-disc hologram systems), and such systems are not suitable for fast replication.

Also, the holographic disc reading system of previous full-disc hologram one designs have primarily used plane-wave beams with a small beam diameter, which preferably match the recording conical beam wavefront shape when only a small spot area thereof for illuminating the surface of the holographic recording medium is considered. However, the mismatch becomes more problematic when a large readout spot size is needed between the wavefront shape of the reference beam for reading containing the plane beam and that of the reference beam for recording containing the conical beam, such as when a spatial frequency of the recorded data is very high, there is a relatively long diffraction distance between the data pattern and holographic recording medium during recording the holograms, the holographic recording medium is thick, or when it is desirable to read out a large portion of the recorded hologram and read the data from the read image.

SUMMARY OF THE INVENTION

Accordingly, several objects of the present invention are:
(a) to dramatically increase the data readout transfer rate of full-disc hologram systems, while preserving the advantage of fast replication, by arranging pixels indicating data in arrays within the data page included in the holographic recorded image;
(b) to use data mask patterns for recording the hologram that can be fabricated by existing disc mastering technologies;
(c) to reduce the data readout error rate due to reconstructing intensity and noise variations within the reconstructed image of the hologram;
(d) to reduce the laser power requirement for reconstructing the hologram by permitting the use of detectors for reading the data from the hologram with high sensitivity and low noise; and
(e) to enhance the image quality of the reconstructed image of the hologram for reading the data by adjusting the wavefront shape of reference beam for reading to preferably match the shape of reference beam for recording, even for wide readout beams.

The present invention is devised in consideration of the objects. According to one aspect of the present invention, a substantially disc-shaped holographic recording medium comprises at least one recorded hologram, wherein the hologram is recorded over approximately the entire surface of the holographic recording medium, such that substantially the entire the hologram can be reconstructed by illuminating the holographic recording medium with a substantially conical reference beam of coherent light of a predetermined wavelength, such that the conical reference beam illuminates the holographic recording medium in an approximately circularly symmetric fashion, and the hologram comprises recorded images of a plurality of data pages comprising a plurality of pixels arranged in an approximately rectangular array.

According to another aspect of the present invention, a hologram reading system comprises: (a) a light source for producing a reference beam for reading which produces a reference beam for reading comprising an approximately cylindrical coherent beam with a small curvature; (b) at least one detector array; (c) a substantially disc-shaped holographic recording medium comprising at least one recorded hologram, wherein the hologram is recorded over approximately the entire surface of the holographic recording medium, such that substantially the entire the hologram can be reconstructed by illuminating the holographic recording medium with a substantially conical reference beam of coherent light of a predetermined wavelength, such that the conical reference beam illuminates the holographic recording medium in an approximately circularly symmetric fashion; (d) an optical system for partly imaging the reconstructed image of the hologram to the detector array; (e) a motor for rotating the holographic recording medium; and (f) a translating mechanism for radially translating the reference beam for reading with respect to the holographic recording medium.

According to another aspect of the present invention, a method of reading data from a substantially disc-shaped holographic recording medium, comprises the steps of: (a) producing a reference beam for reading comprising an approximately cylindrical coherent beam with a small curvature; (b) directing the reference beam for reading onto the holographic recording medium at a predetermined radial incident angle, such that the focus of the reference beam for reading in the tangential direction is approximately on the axis of the holographic recording medium and that the shape of the reference beam for reading at the holographic recording medium is approximately planar in the radial direction, whereby a hologram of a data page is reconstructed; (c) imaging a real image of the reconstructed image of the hologram to a detector array using imaging means for imaging light, such that the real image of the reconstructed image of the data page is suitably aligned with the detector array, whereby data stored in the hologram is read; and (d) moving the hologram with respect to the reference beam for reading without changing the predetermined radial incident angle of the reference beam for reading, whereby a different data page of the hologram is read.

The present invention is embodied in a holographic recording medium, a hologram reading system, and a data reading method from the holographic recording medium, by recording very large capacity holograms on a disc-shaped holographic recording medium by providing a cylindrically symmetric, preferably conical, diverging or converging reference beam for recording. This allows a hologram to be recorded over the entire disc surface in a one-step process, while the symmetry allows the hologram to be read locally by a beam with a fixed angle of incidence while the disc is rotating. Holograms may be multiplexed, such as by incident an angle or wavelength. Relatively few holograms are needed in order to achieve high data capacities, allowing for fast disc replication. The hologram recorded to the disc recording medium includes recorded images a plurality of data pages including a plurality of pixels arranged in page arrays, so that these pages may be read in parallel from the data page by using a detector array. In addition, cylindrical optical elements are used to shape the reference beam for reading, in order to provide a more exact match to the shape of a conical recording reference beam.

Further, objects and advantages will become apparent from a consideration of the drawings and ensuring description.

BRIEF DESCRIPTION OF THE DRAWINGS

FIG. 5A is a diagram showing the preferred configuration for an illuminating optical system of reference beam for reading;

FIG. 5B is a plan view showing a relationship between the holographic disc recording medium and the reference beam for reading;

FIG. 5C is a side view showing a relationship between the holographic disc recording medium and the reference beam for reading;

DESCRIPTION OF THE PREFERRED EMBODIMENTS

Figure 1:
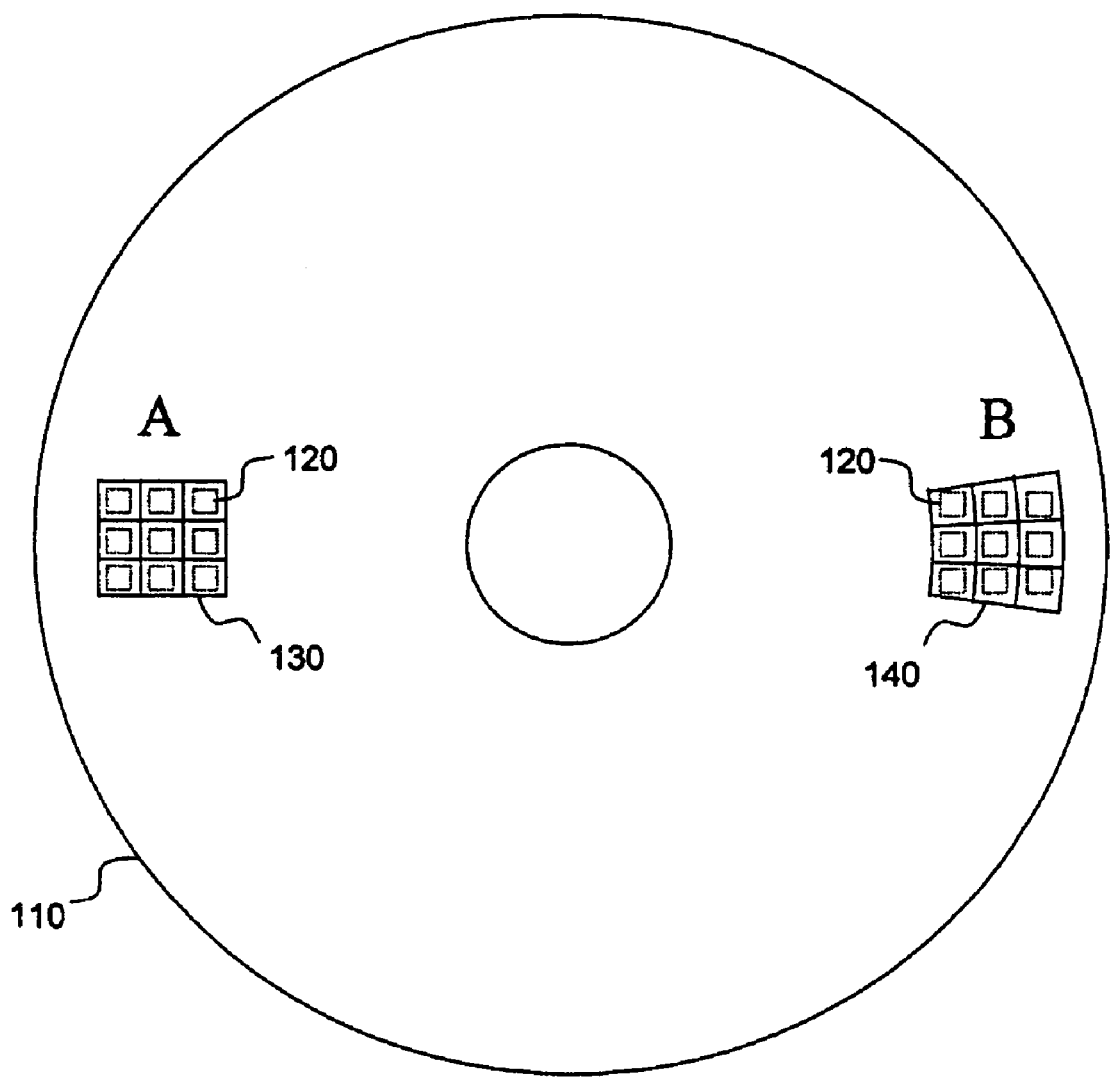
FIG. 1 is a diagram showing two preferred configurations for arranging pixels into data pages on a holographic disc recording medium, using rectangular data pages and cylindrical data pages.
Figure 2:
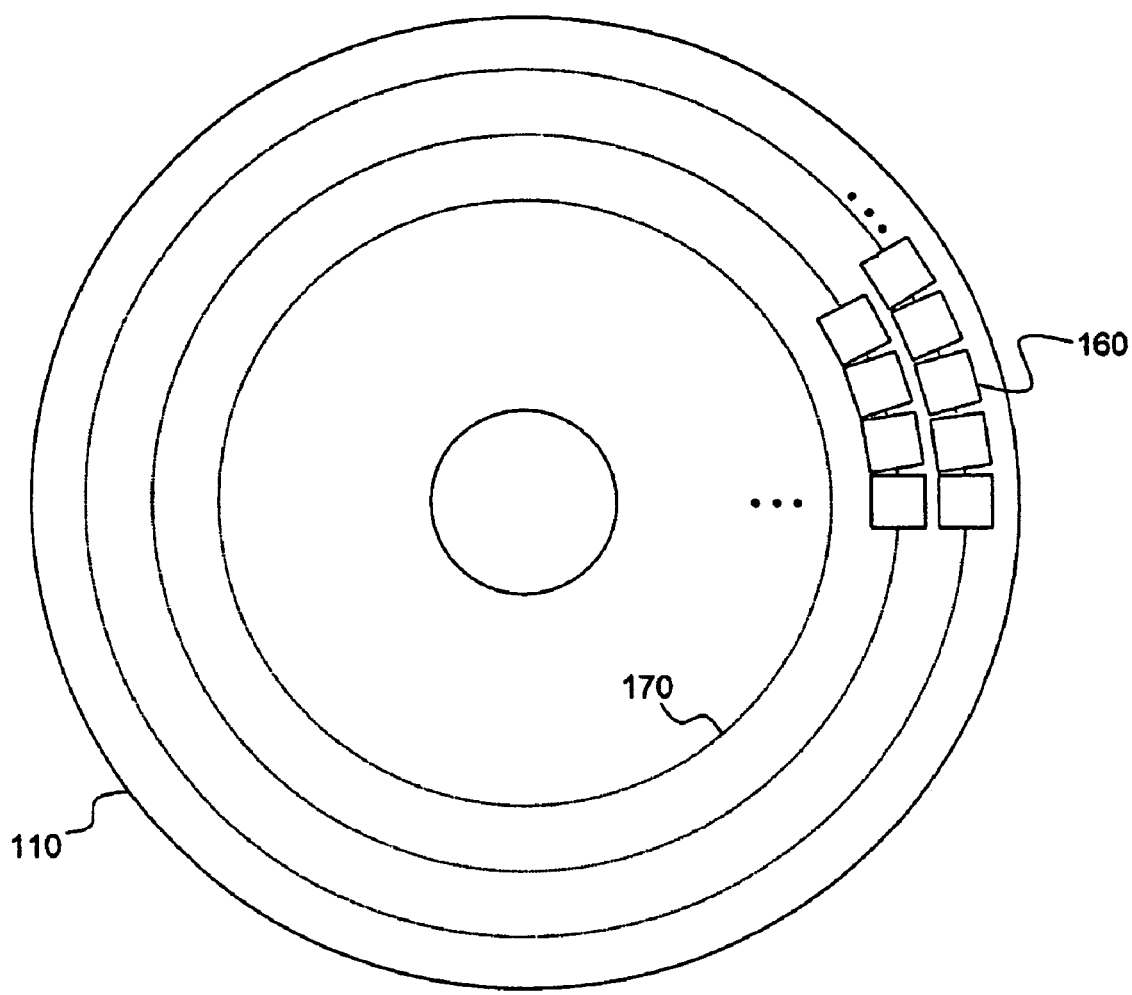
FIG. 2 is a diagram showing one preferred configuration for arranging data pages within the holographic disc recording medium, using concentric circular tracks.
Figure 3:
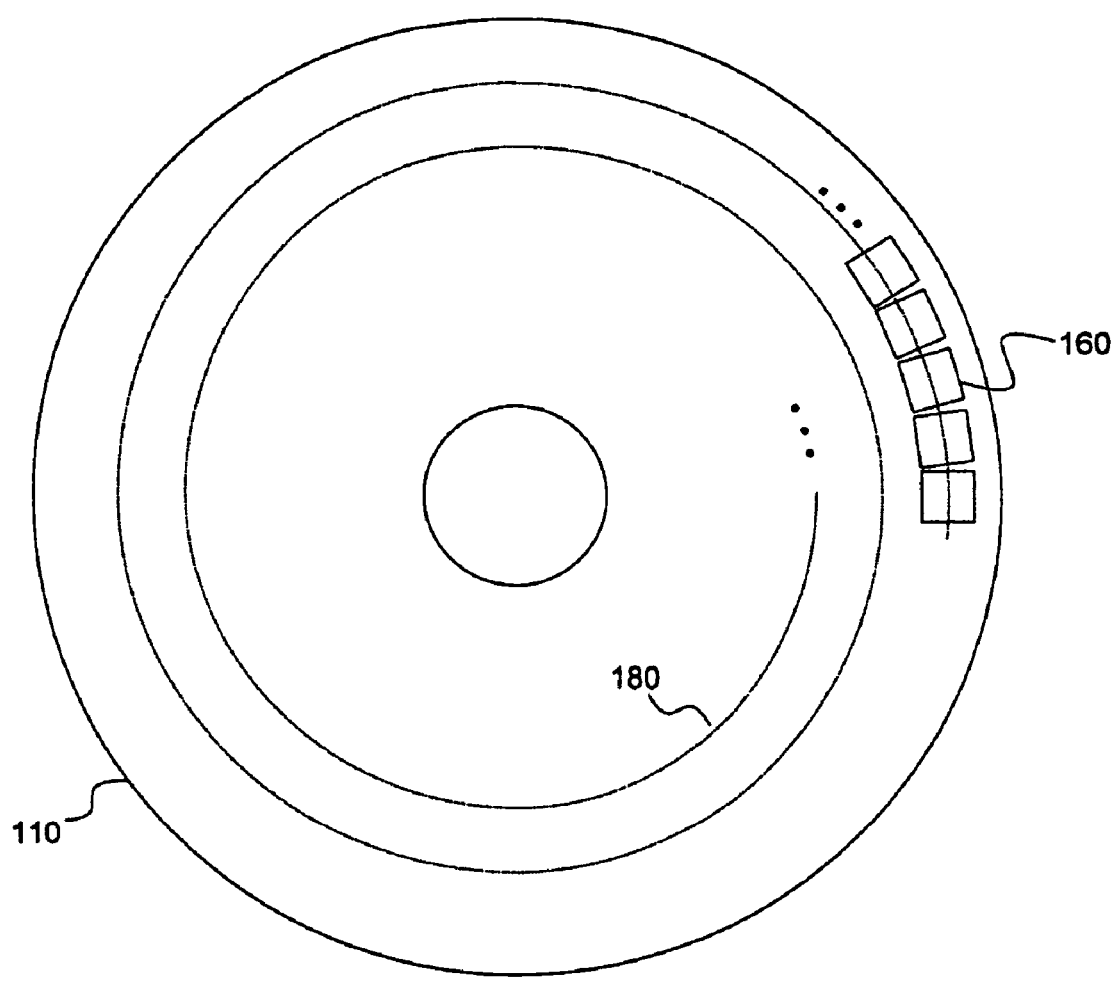
FIG. 3 is a diagram showing another preferred configuration for arranging data pages within a holographic disc recording medium, using a spiral track.
Figure 4:
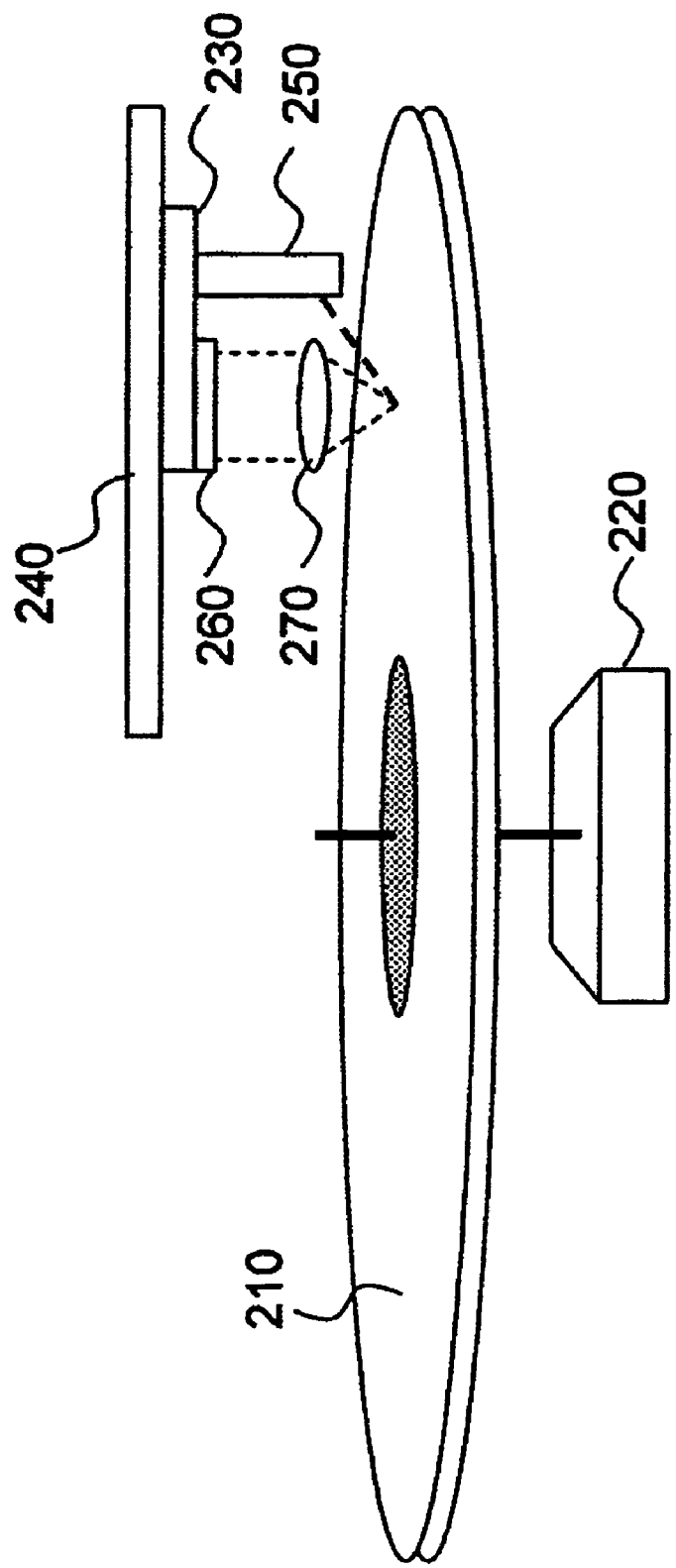
FIG. 4 is a diagram showing the preferred configuration for reading holographic data from the holographic disc recording medium.
Figure 6C:
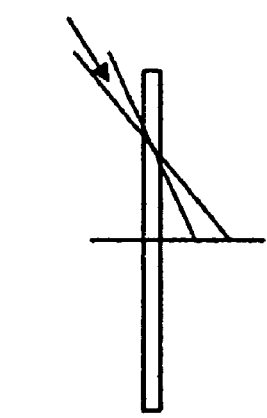
FIG. 6C is a side view showing a relationship between the holographic disc recording medium and the reference beam for reading.
Figure 6A:
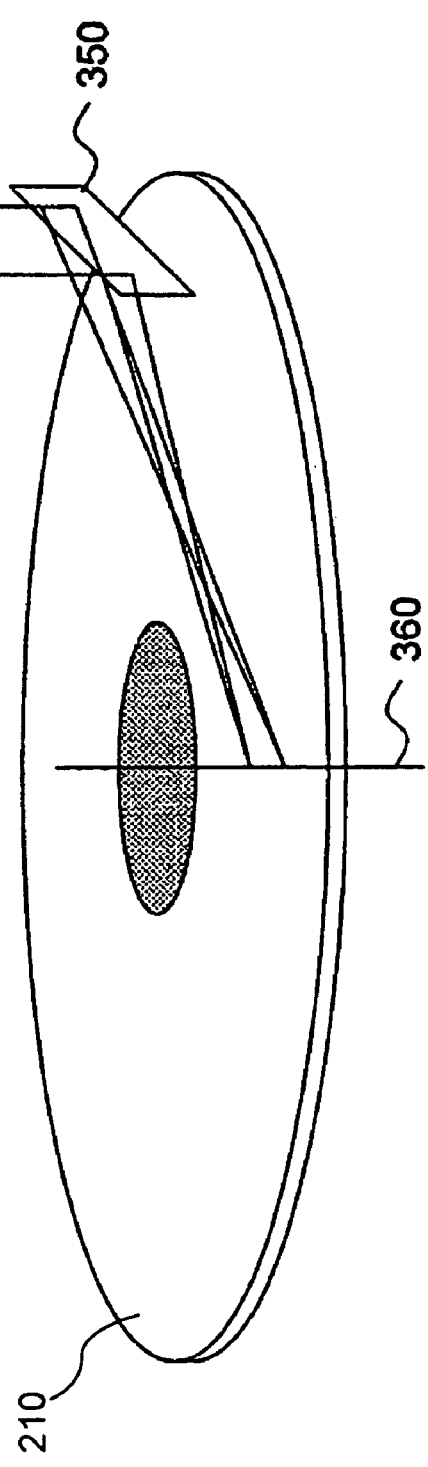
FIG. 6A is a diagram showing the preferred configuration for the illuminating optical system of reference beam for reading when a very narrow spot size on the holographic disc recording medium is sufficient for reading-out.
Figure 6B:
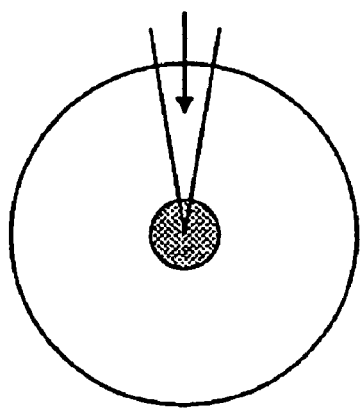
FIG. 6B is a plan view showing a relationship between the holographic disc recording medium and the reference beam for reading.

Hereinbelow, a description is given of embodiments with reference to the drawings. FIG. 1 is a diagram showing two preferred configurations for arranging pixels into data pages on a holographic disc recording medium, using rectangular data pages and cylindrical data pages. FIG. 2 is a diagram showing one preferred configuration for arranging data pages within the holographic disc recording medium, using concentric circular tracks. FIG. 3 is a diagram showing another preferred configuration for arranging data pages within a holographic disc recording medium, using a spiral track. FIG. 4 is a diagram showing the preferred configuration for reading holographic data from the holographic disc recording medium. FIGS. 5A to 5C are diagrams showing one configuration of a reference beam illuminating optical system for reading which produces a relatively-small reading spot. FIGS. 6A to 6C are diagrams showing another configuration of a reference beam illuminating optical system for reading which produces a relatively-small reading spot.

Referring to FIG. 1, two preferred configurations for arranging pixels into data pages corresponding to images recorded to a holographic disc recording medium 110. Detector arrays such as CCD and CMOS detectors are generally shaped so that an active area with the detecting sensitivity includes a rectangular matrix. A target grid 120 shown by a dotted line in FIG. 1 represents a virtual grid on a hologram read image, corresponding to the active area of the detector array, and the size of target grid 120 shown in FIG. 1 depends on the dimensions of the detector array and magnification of an optical system forming an image that will be used for reading-out the data. Preferably, the pixel in the data page is properly aligned with the target grid 120. As shown by reference numeral A in FIG. 1, a data page 130 is rectangular and the best match between the pixels in the data page and the active areas of the detector array is achieved with the same pixel pitch aligned in the data page 130 as that of the target grid 120. The two arrays of (3×3) pixels in FIG. 1 are small for simplicity, but any suitable size may be used, even linear arrays if that is preferred. Typical detector arrays used in holographic data recording have on the order of (1000×1000) pixels. For clarity, the pixel arrays in FIG. 1 are also shown much larger than would be used in practice. For high-density of recording the data, the pixel dimensions in the reconstructed image of the hologram should be on the order of 1 µm and the pixel size is preferably 1 µm$^2$ or less, so that an entire (1000×1000) pixel array area would be about (1×1) mm in size.

For disc-shaped holographic recording medium, the data mask used for recording the hologram is often produced using a disc mastering process similar to that used for making optical disc stampers, such as for compact disc (CD) and digital versatile disc (DVD). With such disc mastering process, it is easier to fabricate a cylindrical data page 140 that follows the curvature of the disc shape. The cylindrical data page 140 can still be used with a rectangular target grid 120, as long as the curvature is small enough that a one-to-one match is maintained between the pixels of the target grid 120 and the pixels of the data page 140, as shown by reference symbol B in FIG. 1. Because the actual arrays will be very small (about 1×1 mm), the curvature of the disc can often be neglected at such a small scale.

FIG. 2 shows one preferred configuration for arranging data pages 160 on the holographic disc recording medium 110 along a plurality of concentric circular tracks 170. The data pages 160 are drawn as rectangles in FIG. 2, but they may also be cylindrical in the arranging configuration shown in FIG. 2. FIG. 3 shows an alternate preferred configuration for arranging the data pages 160 on the holographic disc recording medium 110 along a spiral track 180. Note that in the case of cylindrical data pages in the arranging configuration shown in FIG. 3, the edges between adjacent data pages may match exactly with each other, so that the border between adjacent data pages may not be obvious visually.

Note that FIGS. 1, 2, and 3 represent the shape and pixel arrangement of the source image stored, as the recorded image, in the holographic disc recording medium 110. This is equivalent to the shape and pixel arrangement of pixels on the data mask used for recording the hologram, and it is also equivalent to the image that is reconstructed, if the holographic disc recording medium 110 for recording the hologram is fully illuminated with the reference beam for reading conjugate with the reference beam for recording used upon recording the hologram. FIGS. 1, 2, and 3 do not necessarily represent the pattern at the holographic disc recording medium itself; because holograms are not always visible by eye, and furthermore the holograms in full-disc hologram systems are not generally recorded at an exact image plane of the original data mask. Hence the pattern actually recorded to the holographic disc recording medium will generally be a diffracted version of the patterns with the disc shape and pixel arrangement shown in FIGS. 1, 2, and 3. The holograms may be recorded to the holographic disc recording medium, using the conventional recording systems such as the holographic disc recording system shown in FIG. 7, with holograms multiplexed in angle or wavelength upon recording the holograms.

FIG. 4 shows the preferred embodiment for reading-out data from a holographic disc recording medium 210 containing one or more holographic recorded images as described above. A reading head 230 is mounted over the disc surface of holographic disc recording medium 210, which is set on a motorized rotation spindle 220 to allow the reading head 230 to access all tangential positions on the holographic disc recording medium 210. The reading head 230 is held by a radial translation mechanism 240, such as a sliding track or rotatable arm. This allows the movement of the reading head 230 to different radial positions of the holographic disc recording medium 210. The reading head 230 comprises an illuminating optical system 250 of reference beam for reading, an imaging optical element 270 such as an objective lens, and a detector array 260 in appropriate positions to properly reconstruct the holographic data on the holographic disc recording medium 210 and image the real image of the reconstructed data pages onto the detector array 260. All recording locations on the holographic disc recording medium 210 may be accessed by the reading head 230 by spinning the holographic disc recording medium 210 and moving the reading head 230 radially.

Figure 7:
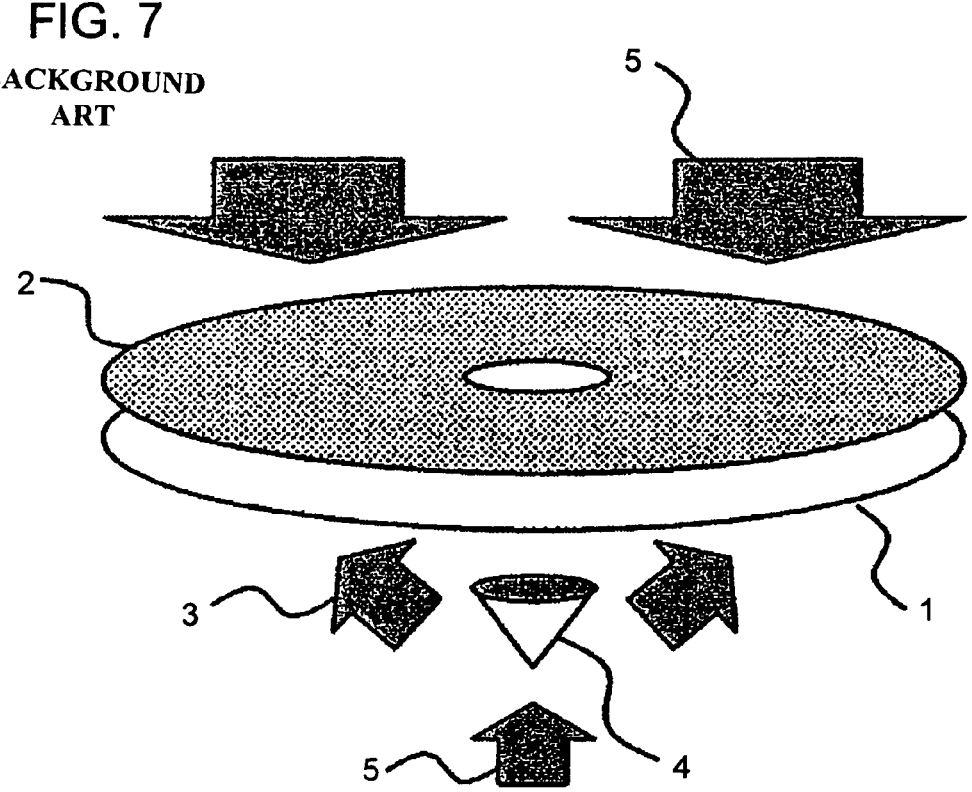
FIG. 7 is a diagram showing one example of a holographic disc recording system with a full-disc hologram configuration according to a conventional art.
Figure 8:
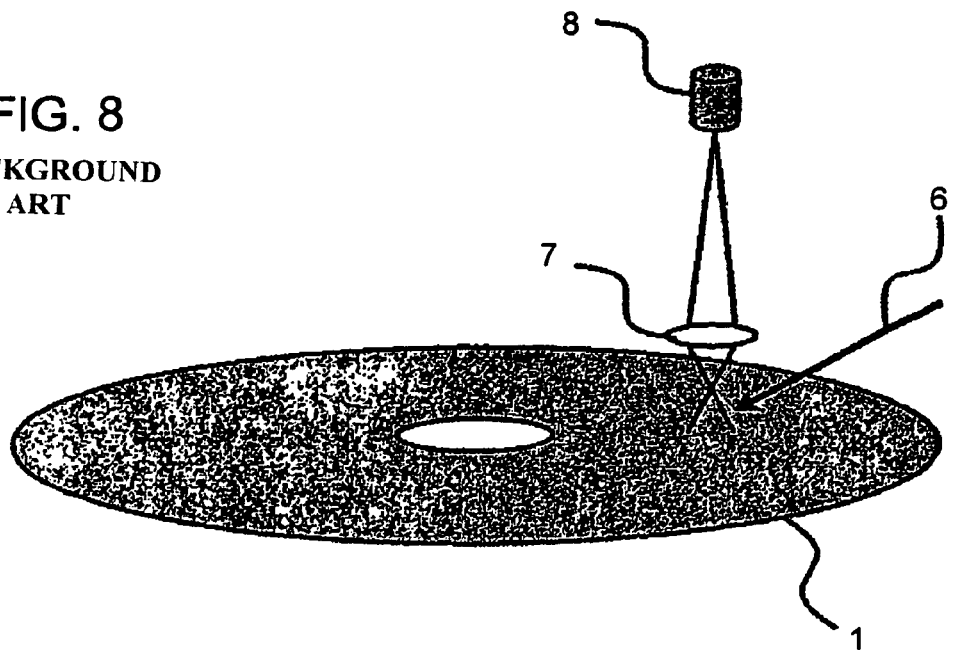
FIG. 8 is a diagram showing another example of a holographic disc recording system with the full-disc hologram configuration according to the conventional art.

FIG. 5A is a diagram showing the preferred configuration for the illuminating optical system 250 of reference beam for reading. FIG. 5B is a plan view showing a relationship between the holographic disc recording medium 210 and the reference beam for reading. FIG. 5C is a side view showing a relationship between the holographic disc recording medium 210 and the reference beam for reading. Coherent laser beams irradiated from a laser source 310 serving as a coherent light source are expanded and collimated with a beam expansion optical element 320 and a collimation optical element 330, thus becoming collimated beams. The resulting collimated beam passes through a cylindrical optical element 340, such as a cylindrical lens, to produce a cylindrical beam with a cylindrical waveplane, which is then directed and irradiated by a mirror 350 to the holographic disc recording medium at the proper incident angle for reading the holograms. The holographic disc recording medium 210 is a holographic disc recording medium which records the holograms by using a conical mirror as shown in FIG. 7, and the orientation and position of the cylindrical optical element 340 are set so that the focus of the reference beam for reading with the cylindrical-wave shape is coincident with a disc axis 360. This produces the wave shape of the reference beam for reading that can closely match that of the reference beam for recording comprising the conical beam used for recording the holograms.

If the required read-out spot size on the holographic disc recording medium is very small, the wave shape of the reference beam for reading is shaped to be a planewave by using the focus of beams with the light intensity distribution as Gaussian distribution. FIG. 6A is a diagram showing the preferred configuration for the illuminating optical system of reference beam for reading when a very narrow spot size on the holographic disc recording medium is sufficient for reading-out. FIG. 6B is a plan view showing a relationship between the holographic disc recording medium 210 and the reference beam for reading. FIG. 6C is a side view showing a relationship between the holographic disc recording medium 210 and the reference beam for reading. This configuration in FIG. 6A is the same as that of FIG. 5A, except that the cylindrical optical element 340 has been replaced with two cylindrical elements whose axes are extended in the orthogonal direction, comprising a tangential converging cylindrical optical element 342 and a radial converging cylindrical optical element 344. The attachment of tangential converging cylindrical optical element 342 and the radial converging cylindrical optical element 344 allows the independent control of the tangential converging position (focal point converged in the tangential direction of the holographic disc recording medium 210) of the reference beam for reading and the radial converging focal positions (focal point converged in the radial direction of the holographic disc recording medium 210). In this case, the tangential converging cylindrical optical element 342 in the configuration shown in FIG. 6A performs the same function as the cylindrical optical element 340 in the configuration shown in FIG. 5A, which is to provide the curvature of the cylindrical waves of the reference beam for reading that substantially matches that of the reference beam for recording comprising the conical beam used for recording the holograms to the holographic disc recording medium 210, and it is positioned such that the tangential focus of the reference beam for reading is coincident with the disc axis 360. The radial converging cylindrical optical element 344 converges the reference beam for reading in the radial direction of the holographic disc recording medium 210 and thus the radial focal point is positioned on the holographic disc recording medium 210.

For reading out the holograms with the incident-angle multiplex, the mirror 350 may be controllable in position and angle. And for reading out the holograms with the wavelength multiplex, the laser source 310 serving as a coherent laser source may be tunable in wavelength.

Thus the reader will see that the holographic memory system according to the invention provides a simple method for combining the page-array data structure according to the conventional holographic data storage architectures with the full-disc hologram recording systems, to create the holographic disc recording medium that facilitates the fast replication and supports highly parallel reading operation for fast data transfer rate. Because of the high parallelism, discs do not have to be rotated at high speed in order to achieve high transfer rates, as would be required for the holographic disc recording medium containing the data patterns in tracks having the aligned pixels similar to the conventional optical discs such as a CD and a DVD. In the holographic disc recording medium according to the present invention, if necessary, the rotation of holographic disc recording medium can even be incrementally stepped, instead of spun continuously, to allow for longer light integration times of photons in the detector array upon reading-out each data page, which reduces requirements for laser power, hologram reconstructing intensity, and detector sensitivity. Mechanical fluctuations such as disc wobble are also reduced, and servos such as for tracking and focusing also do not have to respond as quickly at lower rotation speed of the holographic disc recording medium.

Advantageously, the hologram reading methods described according to the invention can reduce or eliminate the mismatch between the wave shapes of the reference beams for recording and for recording by approximating them, as compared with the conventional hologram reading method previously proposed by the present inventor. That is, according to the conventional hologram reading method, the plane-wave beam with a narrow beam diameter is used, as the reference beam for recording, to approximate the wave shape of the reference beam for recording comprising the conical beam only at the small spot-area. On the contrary, according to the hologram reading method of the present invention, the reference beam for reading with the cylindrical wave shape of the small curvature is used and therefore the curvature of the wave of the reference beam for reading preferably matches that of the reference beam for recording all over the large spot area. This becomes increasingly important for high data-recording-density holographic disc recording medium which requires thicker ones, resulting in larger pixel diffraction at the hologram recording area for recording a specific hologram on the holographic disc recording medium, and hence requires a correspondingly larger spot size to cover the entire increased hologram recording area.

Furthermore, the present invention has the following additional advantages in that:
(1) the system according to the present invention uses a simple optical component;
(2) the data mask according to the present invention can be produced with the disc mastering technology used for manufacturing the conventional optical disc; and
(3) the pixel size and the pitch within the data pages may be adjusted through the disc mask mastering process for manufacturing the necessary data mask.

While the above description contains much specificity, these should not be construed as limitations on the scope of the present invention, but rather as an exemplification of some of the preferred embodiments thereof. Many other variations are possible. The figures are drawn for the case of reading-out the holograms recorded with the reference beam for recording comprising the conical beam for conically diverging the beams with the reference beam for reading having the cylindrical wave shape for propagating the beam in the inverse converging direction. However, the embodiments of the present invention can easily be adapted for reading-out the holograms recorded with the reference beam for recording comprising the conical beam for propagating the beams in the conically-converging direction, with the reference beam for reading having the cylindrical wave shape for propagating the beam in the same or inverse direction. In the case where the reference beam for reading has the cylindrical wave shape for propagating from the inner radial edge toward the outer radial edge of the disc, the focus of the reference beam for reading is positioned at the disc axis, but it will be a virtual focus since the beam propagates away from the disc axis.

FIG. 1 shows the square arrangement having (N×N) pixels in the data pages, but any suitable size may be used, such as (M×N) pixels in the rectangular arrangement or (N×1) pixels in the linear arrangement. The pixels in the data pages may be larger or smaller than the pixels in the target grid 120, and the fill factor of the data pages does not have to be 100% (there may be blank areas around each pixel). The present invention only requires a way to match the pixels in the data page to those in the detector target grid without error.

For reconstructing the holograms by using the holographic disc reading systems according to the present invention, the motorized rotation spindle 220 may rotate in steps or continuously. The laser source 310 serving as a coherent laser source 310 may be continuous-wave (CW), pulsed, or tunable in wavelength. Referring to FIGS. 5A and 6A, the illuminating optical system of reference beam for reading includes the separate optical elements for beam expansion and collimation and cylindrical optical element. Further, the cylindrical optical element is arranged in the back of the optical elements for beam expansion and collimation in the beam path. The described configuration is used for clarity and ease of understanding characteristics of the illuminating optical system of the reference beam for reading. However, the number of optical elements can be reduced to one by combining the functions of some of these lenses. Also, if the light emitted from the laser is naturally divergent, then the optical element for beam expansion is unnecessary. According to the present invention, the cylindrically shaped reference beam for reading is used to match the curvature of the reference beam for reading in order to minimize distortion of the hologram reconstructed image. Any suitable optical system or combination of optical elements may be used to achieve this shape of the reference beam for reading.

Accordingly, the scope of the invention should be determined not by the embodiments illustrated, but by the appended claims and their legal equivalents.

What is claimed is:

1. A hologram reading system, comprising:
   (a) a light source for producing a reference beam for reading which produces a reference beam for reading comprising an approximately cylindrical coherent beam with a small curvature;
   (b) at least one detector array;
   (c) a substantially disc-shaped holographic recording medium comprising at least one recorded hologram, wherein said hologram is recorded over approximately an entire surface of said holographic recording medium, such that said hologram can be substantially entirely reconstructed by illuminating said holographic recording medium with a substantially conical reference beam of coherent light of a predetermined wavelength, such that said conical reference beam illuminates said holographic recording medium in an approximately circularly symmetric fashion;
   (d) an optical system for partly imaging the reconstructed image of said hologram to said detector array;
   (e) a motor for rotating said holographic recording medium; and
   (f) a translating mechanism for radially translating said reference beam for reading with respect to said holographic recording medium,
   wherein said hologram comprises recorded images of a plurality of data pages comprising a plurality of pixels arranged in an approximately rectangular array.

2. The hologram reading system according to claim 1, wherein said approximately rectangular array is substantially cylindrical in shape.

3. The hologram reading system according to claim 1, wherein the recorded images of said plurality of data pages are arranged in a plurality of concentric circular tracks in said hologram.

4. The hologram reading system according to claim 1, wherein the recorded images of said plurality of data pages are arranged in at least one spiral track in said hologram.

5. The hologram reading system according to claim 1, wherein said pixels in the reconstructed image of said hologram are one or less square micron in size.

6. The hologram reading system according to claim 1, wherein different holograms are reconstructed by changing the incident angle of said conical reference beam on said holographic recording medium.

7. The hologram reading system according to claim 1, wherein different holograms are reconstructed by changing the wavelength of said conical reference beam.

8. The hologram reading system according to claim 1, wherein said light source for producing the reference beam for reading is tunable in wavelength.

9. The hologram reading system according to claim 1, wherein said light source for producing a reference beam for reading comprises a pulsed laser.

10. The hologram reading system according to claim 1, further comprising:
   a changing unit configured to change the incident angle of said reference beam for reading on said hologram recording medium.

11. The holographic reading system according to claim 1, wherein said light source for producing the reference beam for reading comprises at least one cylindrical optical element.

12. The holographic reading system according to claim 1, wherein said cylindrical reference beam for reading has a focus in the tangential direction of said disc-shaped holographic recording medium at approximately the axis of said holographic recording medium.

13. The holographic reading system according to claim 1, wherein said light source for producing the reference beam for reading contains at least two cylindrical optical elements with their cylindrical axes extended in orthogonal directions.

14. The holographic readout system according to claim 1, wherein said cylindrical reference beam for reading has a focus in the tangential direction of said disc-shaped holographic recording medium at approximately the axis of said holographic recording medium and a focus in the radial direction at approximately the surface of said holographic recording medium.

15. A method of reading data from a substantially disc-shaped holographic recording medium, said method comprising the steps of:

(a) producing a reference beam for reading comprising an approximately cylindrical coherent beam with a small curvature;

(b) directing said reference beam for reading onto said holographic recording medium at a predetermined radial incident angle, such that the focus of said reference beam for reading in the tangential direction is approximately on the axis of said holographic recording medium and that the shape of said reference beam for reading at said holographic recording medium is approximately planar in the radial direction, such that a hologram of a data page is reconstructed;

(c) imaging a real image of the reconstructed image of said hologram to a detector array using an imaging unit that images light, such that the real image of the reconstructed image of said data page is suitably aligned with said detector array, such that data stored in said hologram is read; and (d) moving said hologram with respect to said reference beam for reading without changing said predetermined radial incident angle of said reference beam for reading, such that a different data page of said hologram is read,
wherein said hologram is read from approximately an entire surface of said holographic recording medium and said hologram comprises recorded images of a plurality of data pages comprising a plurality of pixels arranged in an approximately rectangular array.

16. The method of reading data according to claim 15, wherein in said reconstructing step, said radial incident angle of said reference beam for reading is changed, such that a different hologram is reconstructed.

17. The method of reading data according to claim 15, wherein in said reconstructing step, the wavelength of said reference beam for reading is changed, such that a different hologram is reconstructed.

* * * * *